United States Patent
Gopasetty et al.

(10) Patent No.: US 12,478,723 B2
(45) Date of Patent: Nov. 25, 2025

(54) EXTRACORPOREAL BIOENGINEERED DUAL-CELL LIVER REGENERATION SYSTEM (EBDLR) AND BIO PURIFIER THEREFOR

(71) Applicant: YKRITA LIFESCIENCES PRIVATE LIMITED, Karnataka (IN)

(72) Inventors: Mahesh Gopasetty, Bangalore (IN); Jagadeesh Gopalan, Bangalore (IN); Akshay Datey, Bangalore (IN)

(73) Assignee: YKRITA LIFESCIENCES PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/025,190

(22) PCT Filed: Mar. 7, 2023

(86) PCT No.: PCT/IN2023/050216
§ 371 (c)(1),
(2) Date: Mar. 8, 2023

(87) PCT Pub. No.: WO2024/105681
PCT Pub. Date: May 23, 2024

(65) Prior Publication Data
US 2024/0316257 A1 Sep. 26, 2024

(30) Foreign Application Priority Data
Nov. 19, 2022 (IN) .............. 202241066541

(51) Int. Cl.
*A61M 1/36* (2006.01)
*A61M 1/34* (2006.01)
(Continued)

(52) U.S. Cl.
CPC ........ *A61M 1/3689* (2014.02); *A61M 1/3496* (2013.01); *A61M 1/3638* (2014.02);
(Continued)

(58) Field of Classification Search
CPC .... A61M 1/36; A61M 1/3621; A61M 1/3489; A61M 1/0259; A61M 1/3401;
(Continued)

(56) References Cited

U.S. PATENT DOCUMENTS

2016/0333295 A1* 11/2016 Baker .................... C12M 23/16
2017/0252701 A1* 9/2017 Nosrati ............... A61M 1/1696
(Continued)

*Primary Examiner* — Andrew J Mensh
*Assistant Examiner* — Meagan Ngo
(74) *Attorney, Agent, or Firm* — Prakash Nama; Global IP Services, PLLC

(57) ABSTRACT

An EBDLR system includes a multi-layered bio purifier having a plurality of layers. Each layer includes a membrane, a first type of cells on a first side of the membrane in a first channel, and a second type of cells on a second side of the membrane in a second channel. The EBDLR includes a plasma separator to receive blood from a subject and separate a plasma component from the blood, a first reservoir to collect the plasma component, and a second pump to move the plasma component from the first reservoir to the multi-layered bio purifier. The multi-layered bio purifier distributes the plasma component into the first and second channels of each layer to purify the plasma component. The EBDLR includes a second reservoir to collect the purified plasma component and a third pump to infuse the purified plasma component from the second reservoir into the subject.

15 Claims, 6 Drawing Sheets

(51) Int. Cl.
  *A61M 60/113*   (2021.01)
  *A61M 60/279*   (2021.01)
  *A61M 60/37*    (2021.01)
  *A61M 60/531*   (2021.01)

(52) U.S. Cl.
  CPC ........ *A61M 1/3672* (2013.01); *A61M 60/113* (2021.01); *A61M 60/279* (2021.01); *A61M 60/37* (2021.01); *A61M 60/531* (2021.01); *A61M 2205/3306* (2013.01); *A61M 2205/3331* (2013.01); *A61M 2205/3368* (2013.01)

(58) Field of Classification Search
  CPC ........ A61M 1/36225; A61M 1/362261; A61M 1/362266; A61M 60/847
  See application file for complete search history.

(56) References Cited

U.S. PATENT DOCUMENTS

2021/0176984 A1\*  6/2021 Paun ........................ C12M 29/04
2022/0143293 A1\*  5/2022 Shi ........................ A61M 1/3672

\* cited by examiner

EXTRACORPOREAL BIOENGINEERED DUAL-CELL LIVER REGENERATION SYSTEM (EBDLR) AND BIO PURIFIER THEREFOR

TECHNICAL FIELD

The present disclosure relates to medical devices, and more particularly to methods, techniques, and systems for treating a subject with acute liver failure using an extracorporeal bioengineered dual-cell liver regeneration system (EBDLR).

BACKGROUND

Liver is one of the most vital organs of the human body. It plays a fundamental role in metabolic activities such as the regulation of glucose levels in the blood, production of plasma proteins, drug metabolism, production of bile, and presents a complex structure from a morphological and functional point of view. Being so indispensable, this organ is also prone to injury and damage. Although, the liver is known to have excellent regeneration capacity, under certain conditions, it fails to recover. Acute liver failure is one such condition which is classified as a medical emergency. Acute liver failure is a medical condition where the liver stops functioning in a short span of time. Orthotropic liver transplant is currently the most sought out treatment modality across the globe. With a success rate of 75%, it is often presented with challenges where 50% of the patients may not receive a liver transplant.

Figure 1A:
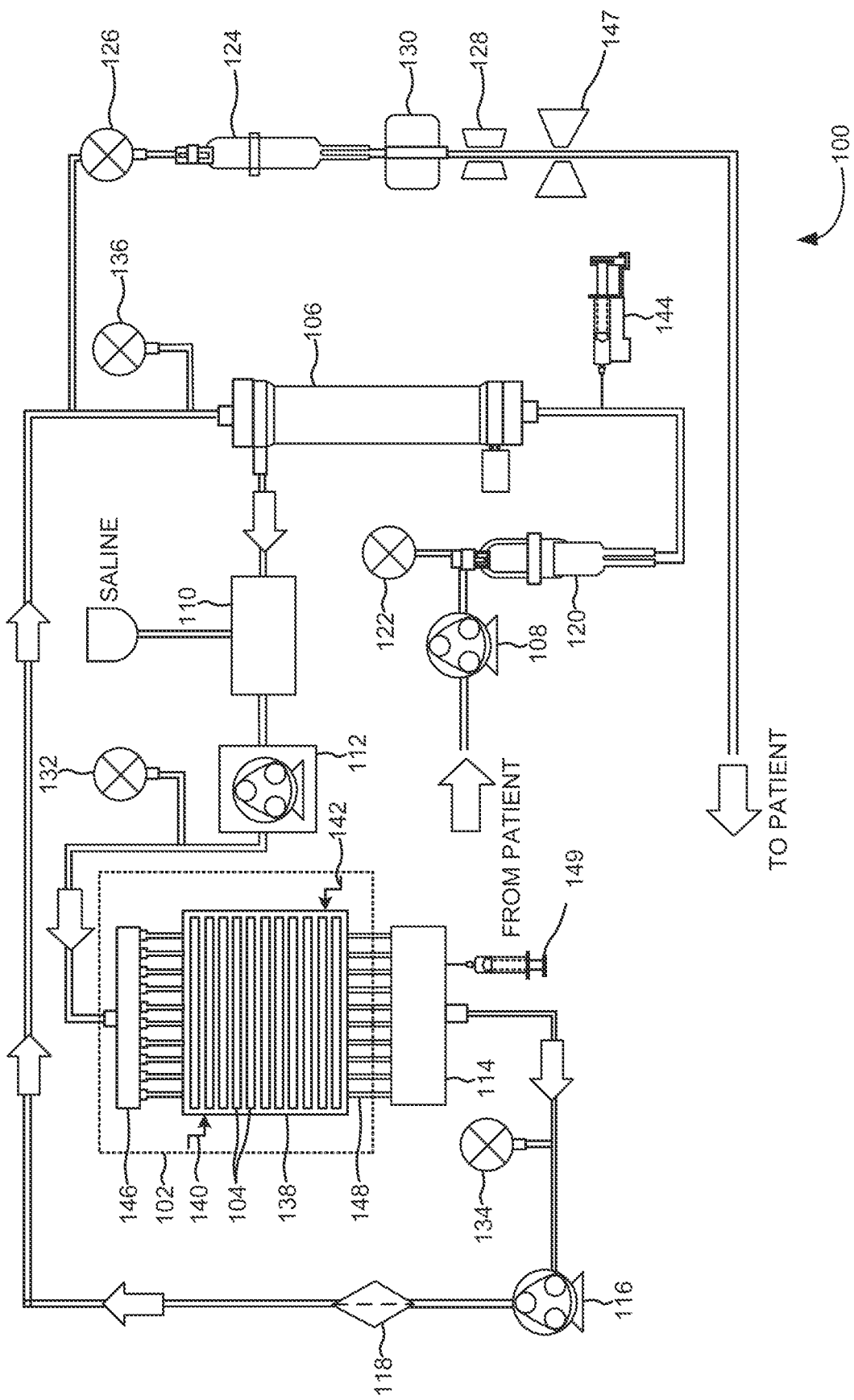
FIG. 1A is a schematic diagram of an example extracorporeal bioengineered dual-cell liver regeneration (EBDLR) system including a multi-layered bio purifier.

The drawings described herein are for illustrative purposes and are not intended to limit the scope of the present subject matter in any way.

DETAILED DESCRIPTION

Acute liver failure (ALF) is a life-threatening illness, where a normal liver fails within days to weeks. Sudden loss of synthetic and detoxification function of liver results in jaundice, encephalopathy, coagulopathy, and multiorgan failure. The etiology of acute liver failure varies demographically. In some places, acute viral hepatitis is the most common cause of acute liver failure. The mortality of acute liver failure is as high as 40-50% and causes of death in acute liver failure include brain herniation due to raised intracranial pressure (35%) and sepsis with multi-organ failure. Acute liver failure occurs when liver cells are damaged significantly and are no longer able to function.

Some existing methods and systems are designed keeping in mind the requirements of managing patients with acute liver failure in clinics/hospitals. The current modality of treatment includes medications to reduce liver damage and antidotes against the causative agent. For example, N-acetylcysteine and activated charcoal is routinely administered in cases of the drug-induced acute liver failure. Extremely critical cases usually require emergency liver transplants. The problems associated with the liver transplant are diverse. They range from finding a suitable donor to the costs associated with the surgery. Treating a patient diagnosed with the acute liver failure may be a race against time.

Examples described herein may provide an enhanced method, technique, and system to treat patients suffering from an acute liver failure with a bioengineered solution in the form of an extracorporeal bioengineered dual-cell liver regeneration (EBDLR) system. In an example, the EBDLR system may include a multi-layered bio purifier having a plurality of layers. Each layer may include a membrane, a first type of cells on a first side of the membrane in a first channel, and a second type of cells on a second side of the membrane in a second channel. Further, the EBDLR system may include a plasma separator to receive blood from a subject via a first pump and separate a plasma component from the blood, a first reservoir to collect the plasma component, and a second pump to move the plasma component from the first reservoir to the multi-layered bio purifier at a predefined flow rate. The multi-layered bio purifier may distribute the plasma component into the first channel and the second channel of each layer to purify the plasma component. Further, the EBDLR system may include a second reservoir to collect the purified plasma component from the multi-layered bio purifier and a third pump to infuse the purified plasma component from the second reservoir into the subject.

In some existing example techniques, growing cells (i.e., hepatocytes and endothelial cells) has been employed in the field of lab/liver-on chip models. In this example, a small number of hepatocytes are grown on a microbloodic platform for experiments to test drug toxicity. The cell number in such applications is usually in the range of $10^2$-$10^3$. In the examples described herein, the EBDLR system uses an exponentially higher number of cells (e.g., $10^8$-$10^9$). Even though the process of scaling the cell number from $10^3$ to $10^9$ may appear linear, there are complex parameters and calculations involved. The non-linear nature of scaleup associated with biological components like cells is well known. Further, the plasma flow associated with these cells is maintained at a critical rate in the range of 100-500 µL/min. This flow rate technically is classified as a creeping flow. Biological bloods like blood/plasma flowing though capillary is a classic example of a naturally occurring creeping flow. The drag associated with creeping flows is usually high. Thus, initiating and maintaining a creeping flow rate is a difficult condition. Examples described herein may provide a constant creepy flow in the bioreactor/bio purifier. This has been achieved by critically estimating the requirements for the first and second channel dimensions (e.g., serpentine channel dimensions).

Further, the bio purifier described herein may use 2 cell types in a specialised arrangement which allows the cells to crosstalk. The 2 types of cells are hepatocytes and endothelial cells. The arrangement to create a co-culture is derived based on inspiration from the basic understanding of human physiology. In the examples described herein, the EBDLR system, which is an external device, includes full functioning capacity of the liver. The EBDLR system is a lightweight and portable device that can be connected to the host suffering from the acute liver failure. Impure blood from the host is pumped through the device which detoxifies the blood and sends it back into the patient.

Thus, the EBDLR system is built to provide external hepatic support which can be run on a continues basis. The EBDLR system may maintain the hemodynamic parameters of the patient during the procedure. For example, blood withdrawal from the patient may results in peripheral blood pressure drop. This can also lead to the collapse of blood vessels connected to the EBDLR system. Hemodynamic instability is often reported in patients undergoing renal dialysis. In the examples described herein, the flow rates at which the EBDLR system operates is extremely safe (0-300 mL/min). This flow rate does not exert excessive shear stress on the blood cells therefore, it prevents haemolysis and hemodynamic instability. The use of state-of-the-art pressure sensing mechanism makes the EBDLR system one of the safe biomedical devices built for assisting clinicians in managing critically ill patients.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1A is a schematic diagram of an example extracorporeal bioengineered dual-cell liver regeneration (EBDLR) system 100 including a multi-layered bio purifier 102. EBDLR system 100 may refer to a lightweight and portable device that can be connected to a host (e.g., a human, dog, and the like) suffering from an acute liver failure. Impure blood from the host is pumped through EBDLR system 100 which detoxifies the blood and sends the detoxified blood back into the host. Thus, EBDLR system 100 may provide an external-hepatic support to treat hosts (e.g., patients) suffering from the acute liver failure with a bioengineered solution. In this example, EBDLR system 100 may take over the functions of a native liver (both synthetic and detoxifying) when connected to the host.

EBDLR system 100 may employ principles of engineering and biotechnology in a sync. The engineering aspect of EBDLR system 100 takes care of a safe method to withdraw and circulate blood and plasma through EBDLR system 100. Biotechnology approach of EBDLR system 100 ensures that the plasma is detoxified by specialised cells (e.g., hepatocytes and endothelial cells) present in multi-layered bio purifier 102. Thus, external detoxification using EBDLR system 100 may enable the native/injured liver to regenerate aiding the patient's survival.

EBDLR system 100 is a state-of-the-art ensemble of peristaltic pumps, pressure transducers, flow sensors, clamps, and the like. The hardware is electronically integrated to a processor which is responsible for efficient and trouble-free functioning of EBDLR system 100. The processor may be internal or external, but connected, to EBDLR system 100. EBDLR system 100 systematically draws blood from the patient without affecting the native blood pressure. EBDLR system 100 may include multi-layered bio purifier 102 having a plurality of layers 104. An example layer of plurality of layers 104 is explained with respect to FIG. 1B.

Figure 1B:
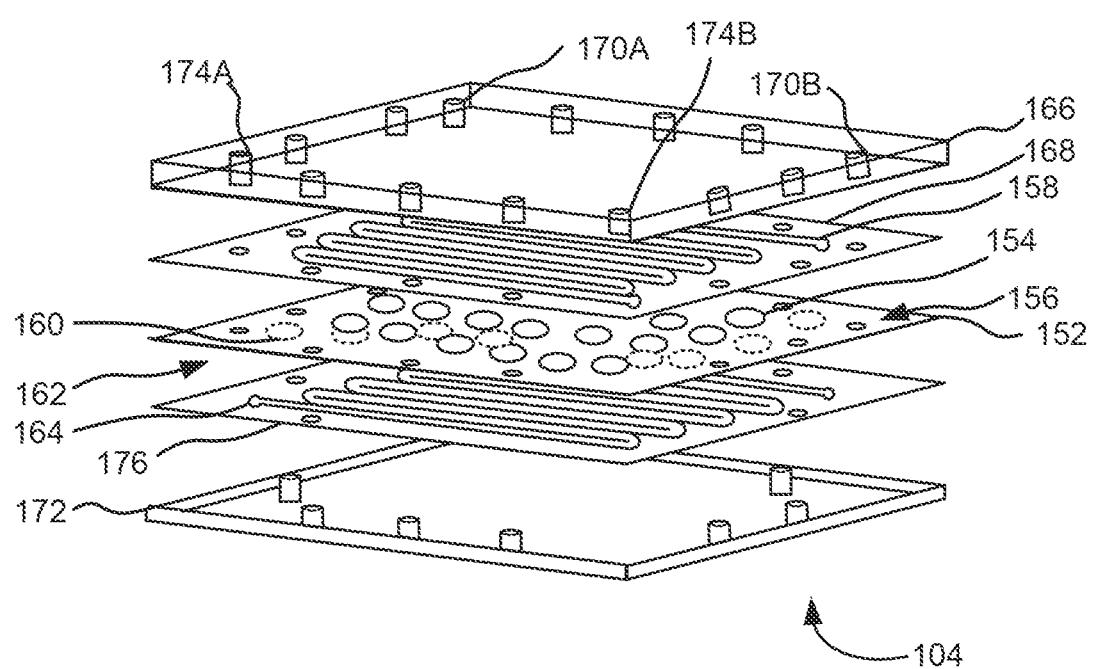
FIG. 1B is an exploded schematic diagram of an example layer of the multi-layered bio purifier of FIG. 1A.

Referring now to FIG. 1B, FIG. 1B is an exploded schematic diagram of an example layer 104 of multi-layered bio purifier 102 of FIG. 1A. Each layer 104 may include a membrane 152, a first type of cells 154 on a first side 156 of membrane 152 in a first channel 158, and a second type of cells 160 on a second side 162 of membrane 152 in a second channel 164. First channel 158 and second channel 164 may be defined on a first substrate 168 and a second substrate 176, respectively. The first type of cells 154 may include hepatocytes and the second type of cells may include endothelial cells. In an example, multi-layered bio purifier 102 may include a total number of the first type of cells in a range of $10^6$-$10^{10}$ cells and a total amount of the second type of cells in a range of $10^6$-$10^{10}$ cells. The total number of the first type of cells and the second type of cells may be grown in multi-layered bio purifier 102 may depend on the type of subject.

Further, each layer 104 may include a first base member 166 disposed on a first adhesive layer (e.g., first substrate 168). First base member 166 may include inlets 170A and 170B to receive the plasma component. Further, first base member 166 may include outlets 174A and 174B to output the purified plasma component. Furthermore, each layer 104 may include a second base member 172 disposed on a second adhesive layer (e.g., second substrate 176). First base member 166 and second base member 172 may form housing for each layer 104. In some examples, inlets 170A and 170B and outlets 174A and 174B may be provided in first base member 166, second base member 172, or a combination thereof. In some examples, inlets 170A and 170B may be provided on first base member 166 and outlets 174A and 174B may be provided on second base member 172.

Referring back to FIG. 1A, multi-layered bio purifier 102 may include a first manifold assembly 146 to split the plasma component into the first channel (e.g., 158) and the second channel (e.g., 164) of the plurality of layers. In an example, first manifold assembly 146 may include a first manifold layer and a second manifold layer. For example, the plasma component is split into a first portion and a second portion. In this example, the first manifold layer may further split the first portion of the plasma component into a plurality of first paths. Each first path may be connected to an input (e.g., inlet 170A) of the first channel of one of the plurality of layers. Further, the second manifold layer may split the second portion of the plasma component into a plurality of second paths. Each second path is connected to an input (e.g., inlet 170B) of the second channel of one of the plurality of layers. Each inlet 170A and 170B may be connected to first manifold assembly 146.

Multi-layered bio purifier 102 may include a second manifold assembly 148 to combine the purified plasma component from the first channel and the second channel of the plurality of layers. In this example, second manifold assembly 148 may include a third manifold layer to receive and combine the processed plasma component from a plurality of third paths. Each third path is connected to an output (e.g., outlet 174A) of the first channel of one of the plurality of layers. Also, second manifold assembly 148 may include a fourth manifold layer to receive and combine the processed plasma component from a plurality of fourth paths. Each fourth path may be connected to an output (e.g., outlet 174B) of the second channel of one of the plurality of layers. Each outlet 174A and 174B may be connected to second manifold assembly 148.

Further, EBDLR system 100 may include a thermally regulated chamber 138 to house multi-layered bio purifier 102. Thermally regulated chamber 138 may maintain a defined temperature of the plasma component passing through multi-layered bio purifier 102. In some examples, EBDLR system 100 may include a first temperature sensor 140 to sense a temperature of the plasma component entering multi-layered bio purifier 102 and a second temperature sensor 142 to sense a temperature of the plasma component leaving multi-layered bio purifier 102. Thus, multi-layered bio purifier 102 is housed in a sophisticated thermally regulated chamber to ensure that the plasma passing through multi-layered bio purifier 102 does not overheat/cool or get dehydrated.

Further, EBDLR system 100 may include a plasma separator 106 to receive blood from a subject (e.g., patient) via a first pump 108 and separate the plasma component from the blood. In some examples, EBDLR system 100 may include an arterial drip chamber 120 to provide a bubble-free infusion of the blood, received from the subject via first pump 108, into plasma separator 106. Further, EBDLR system 100 may include an arterial pressure transducer 122 to monitor a pressure of the blood entering arterial drip chamber 120 and provide feedback to the processor to regulate a flow rate of the blood based on the pressure of the blood entering arterial drip chamber 120.

In some other examples, EBDLR system 100 may include a heparin pump 144 to inject heparin (e.g., anticoagulant) in a blood line of plasma separator 106 based on an activated clotting time (ACT). The heparin may prevent clogging in the plasma separator due to blood clotting. Further, EBDLR system 100 may include a first reservoir 110 to collect the plasma component from plasma separator 106.

Furthermore, EBDLR system 100 may include a second pump 112 to move the plasma component (e.g., heparinised plasma component) from first reservoir 110 to multi-layered bio purifier 102 at a predefined flow rate (e.g., a predefined constant rate). Further, a threshold of 100 mmHg Transmembrane potential (TMP) is maintained. An alarm is activated when the TMP exceeds the set threshold. EBDLR system 100 intelligently adjusts the blood/plasma flow rate to maintain the TMP in the safe limit. Plasma is collected continuously in first reservoir 110 and is monitored for haemolysis using an ultra-sensitive optical blood detector. If haemolysis occurs, the cycle is immediately terminated, and an alarm is raised. Clear plasma is pumped into multi-layered bio purifier 102 through a sophisticated manifold (e.g., first manifold assembly 146 and second manifold assembly 148). The manifold may uniformly split/distribute the plasma flow into the multi-layered bio purifier 102.

In some examples, EBDLR system 100 may include at least one pressure sensor (e.g., pressure transducers 132, 134, and 136) to monitor a flow rate of the blood and/or the plasma component and provide a feedback to a processor to regulate a flow rate in a range of 0 to 100 ml/min and 0 to 300 ml/min of plasma and blood, respectively. For example, EBDLR system 100 may include a first pressure transducer 132 to measure a pressure between second pump 112 and multi-layered bio purifier 102. Multi-layered bio purifier 102 may distribute the plasma component into the first channel (e.g., first channel 158 in FIG. 1B) and the second channel (e.g., second channel 164 of FIG. 1B) of each layer to purify the plasma component.

Further, EBDLR system 100 may include a second reservoir 114 to collect the purified plasma component. Detoxified/purified plasma exits from multi-layered bio purifier 102 via second reservoir 114. In some examples, EBDLR system 100 may include a sampling port 149 to enable a user to collect the purified plasma component for testing purposes without disrupting the flow. Furthermore, EBDLR system 100 may include a third pump 116 to infuse the purified plasma component from second reservoir 114 into the subject. Also, EBDLR system 100 may include a second pressure transducer 134 to measure a pressure between multi-layered bio purifier 102 and third pump 116. In some examples, EBDLR system 100 may include a dual filtration unit 118 having a 2- and 0.2-micron membrane to receive the purified plasma from second reservoir 114 via third pump 116 and filter the purified plasma to remove residual or dislodged cells from the purified plasma. In this example, the filtered plasma may be infused into the subject.

For example, the critical aspect is to infuse the purest form of the plasma component into the patient which is devoid of any residual/dislodged cells from multi-layered bio purifier 102 and/or bacterial contaminants. To achieve this aspect, the plasma component passes through dual filtration unit 118 which has a 2- and 0.2-micron membrane for filtration. The extra-pure plasma (i.e., the filtered plasma) is then infused into the subject through a bubble detector 128 to ensure no air bubble is injected into the patient. This cycle continues for a set volume of blood purification and detoxification. In some examples, EBDLR system 100 can be used continuously for long hours (e.g., 24 hours) without the need to change any of the components.

In some examples, EBDLR system 100 may include a venous drip chamber 124 to provide a bubble-free infusion of a mixture of the purified plasma component and the plasma-separated blood, from which the plasma component has been separated by plasma separator 106, into the subject. Further, EBDLR system 100 may include a venous pressure transducer 126 to monitor a pressure of the mixture entering venous drip chamber 124 and also the subject's blood pressure and provide feedback to the processor to regulate a flow rate of the mixture based on the pressure of the mixture entering venous drip chamber 124. Arterial pressure transducer 122 and venous pressure transducer 126 may provide feedback to EBDLR system 100 to regulate the flow rate of the blood and/or plasma component to minimally affect the blood pressure of the subject. In other examples, EBDLR system 100 may include a third pressure transducer 136 to measure a pressure between plasma separator 106 and venous drip chamber 124 that collects the mixture of the purified plasma component and plasma-separated blood from plasma separator 106.

In some other examples, EBDLR system 100 may include an air bubble detector 128 to receive the mixture of the purified plasma component and the plasma-separated blood via venous drip chamber 124 and infuse the filtered blood and blood mixture into the subject without any air bubble. Also, EBDLR system 100 may include an optical blood detector 130 to monitor the mixture of the purified plasma component and the plasma-separated blood for haemolysis. In response to detecting the haemolysis, a process of detoxifying or purifying the plasma component may be terminated by disconnecting bioengineered dual-cell liver regeneration system 100 from the subject's blood circuit and generate an alarm. In some other examples, EBDLR system 100 may include a venous clamp 147 connected in a blood line. Once saline has substantially displaced all the blood from reservoir 110, venous clamp 147 may be closed so that venous drip chamber 124 may be detached from the patient.

EBDLR system 100 described herein may use medically approved components and electronics. The sensing mechanism allows the detoxification process to happen without affecting the blood pressure of the patient. Further, the use of dual layer filter ensures that extra pure plasma is infused into the patient. Furthermore, TMP measurements and feedback ensure that haemolysis is completely avoided. Optical sensors and pressure transducers ensure that no air bubble is injected into the patient. Also, the tubing set, plasma, and capsule filters are disposable and can be used as one set per session.

Further, EBDLR system 100 may include the processor and memory coupled to the processor. The processor may receive inputs from different components and control the components to regulate a flow rate of the blood/plasma component flowing through EBDLR system 100. The term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof.

Figure 2A:
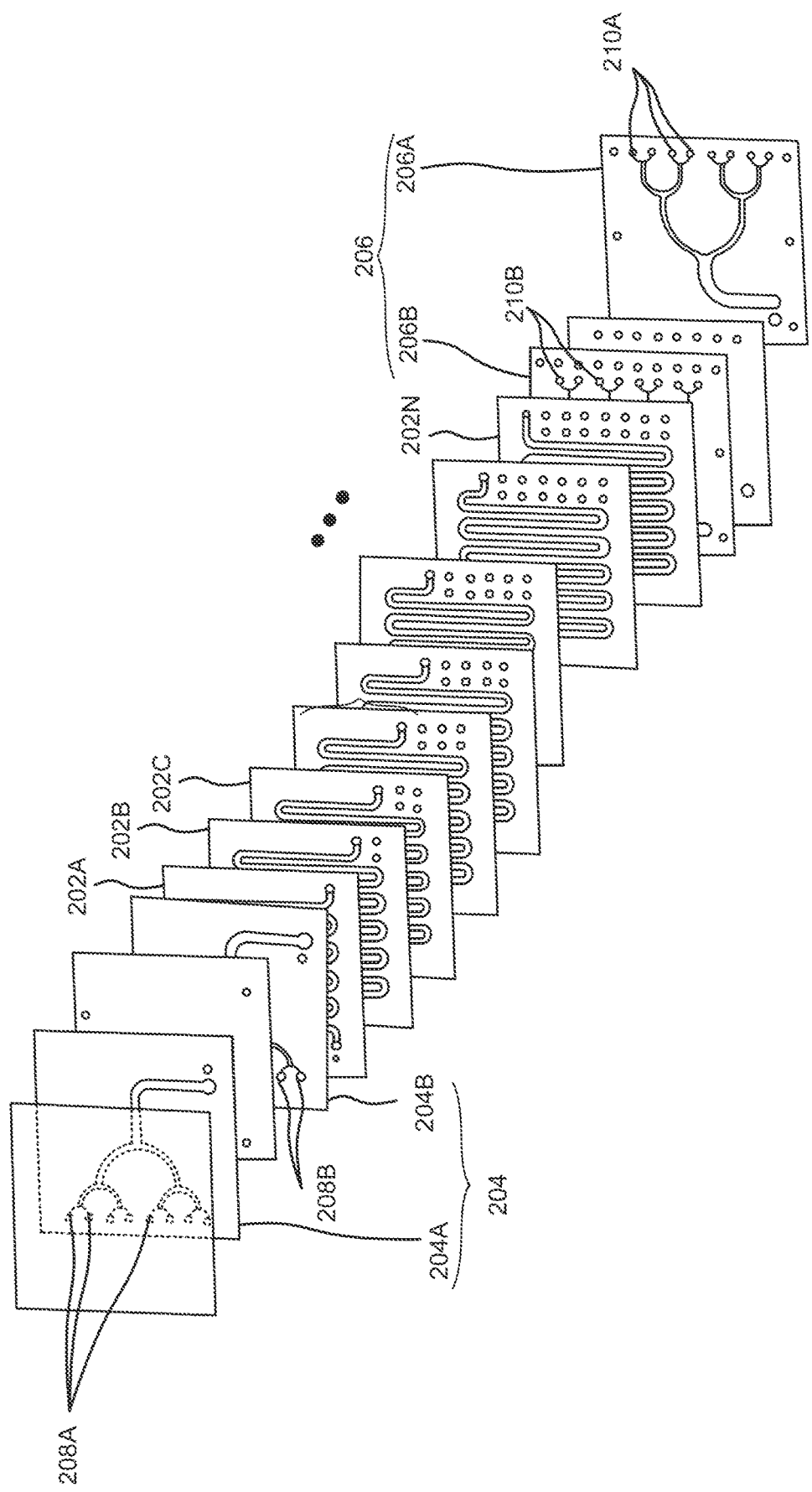
FIG. 2A is an exploded schematic diagram of an example multi-layered bio purifier.

FIG. 2A is an exploded schematic diagram of an example multi-layered bio purifier 200. Example multi-layered bio purifier 200 may include a plurality of layers 202A-202N. An example layer is explained with respect to FIG. 2B.

Figure 2B:
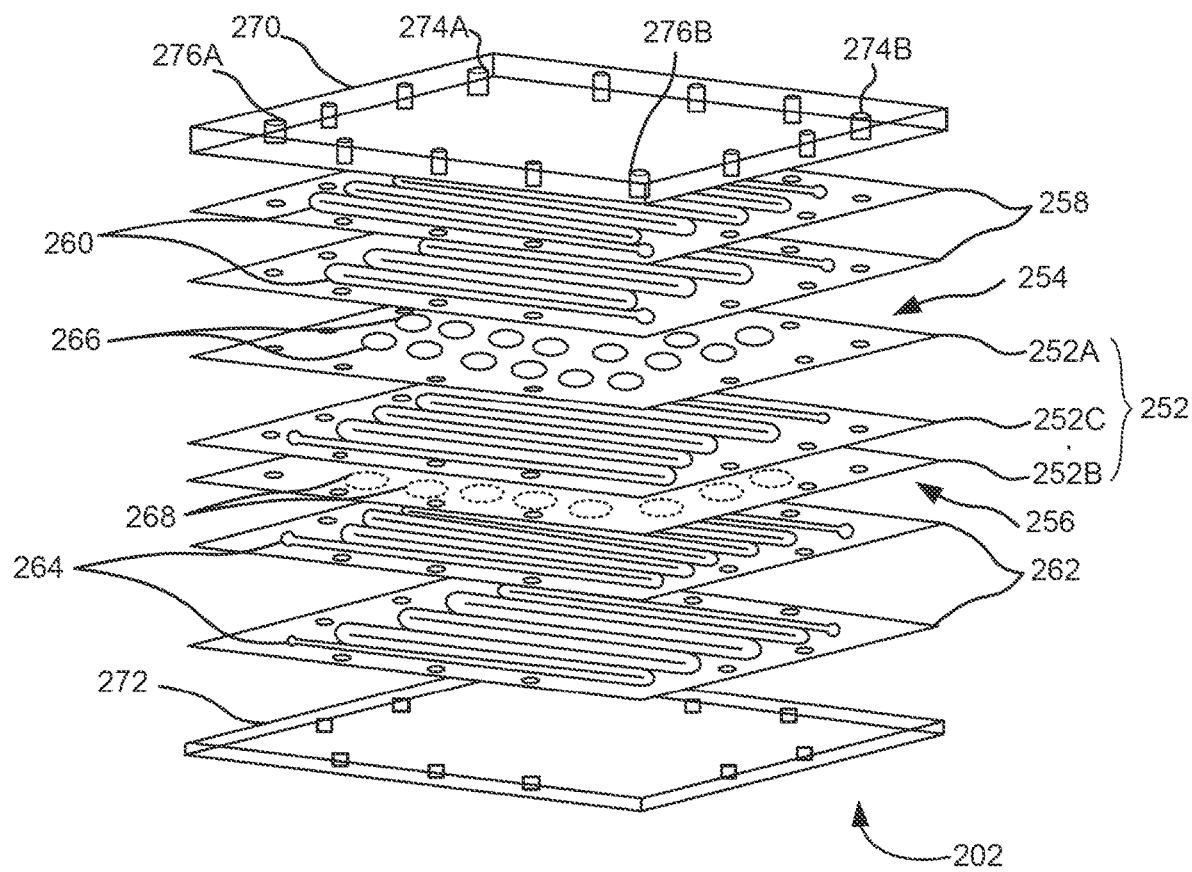
FIG. 2B is an exploded schematic diagram of an example layer of the multi-layered bio purifier of FIG. 2A.
Figure 2C:
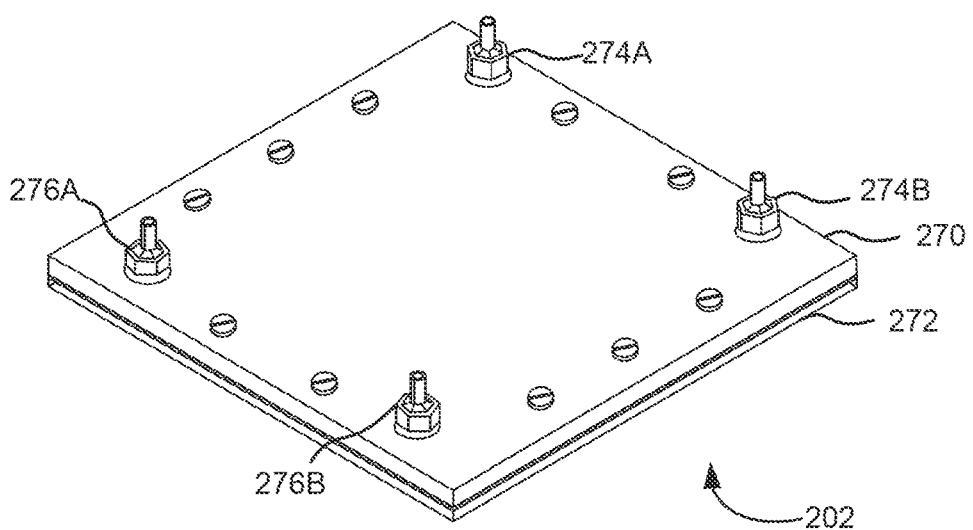
FIG. 2C is an assembled schematic diagram of the example layer of FIG. 2B.

Referring now to FIG. 2B, FIG. 2B is an exploded schematic diagram of an example layer 202 (e.g., one of the plurality of layers 202A-202N) of multi-layered bio purifier 102 of FIG. 2A. FIG. 2C is an assembled schematic diagram of example layer 202 of FIG. 2B. For example, similarly named elements of FIG. 2B may be similar in structure, function, or both to elements described with respect to FIG. 2A. Each layer 202 may include a membrane 252 having a first side 254 and a second side 256 opposite first side 254. In an example, membrane 252 may include a biocompatible material. For example, the biocompatible material may include polycarbonate. Membrane 252 has a pore size of about 0.2-micron and a thickness of about 100-micron.

Further, each layer 202 may include a first channel 260 formed on first side 254 and a second channel 264 formed on second side 256. In the examples shown in FIG. 2B, each layer 202 may include a first substrate 258 (e.g., a first adhesive layer) disposed on first side 254 and a second substrate 262 (e.g., a second adhesive layer) disposed on second side 256. For example, each of first substrate 258 and second substrate 262 may include one or more adhesive layers. An example adhesive layer may include a double-sided tape. In this example, first channel 260 may be defined in first substrate 258 and second channel 264 may be defined in second substrate 262. Also, first channel 260 and second channel 264 may include a serpentine shape to increase a ratio of culture area to membrane 252's area. The serpentine-shaped channels may provide a larger surface area for cells to grow. This can also allow for a higher amount or density of cells in first channel 260 and second channel 264.

Furthermore, each layer 202 may include a first type of cells 266 formed on first side 254 in first channel 260. Also, each layer 202 may include a second type of cells 268 formed on second side 256 in second channel 264. For example, the plurality of layers may include a total number of first type of cells 266 in a range of $10^6$-$10^{10}$ cells and a total amount of second type of cells 268 in a range of $10^6$-$10^{10}$ cells. In an example, first type of cells 266 and second type of cells 268 are co-cultured. In the example shown in FIG. 2B, membrane 252 may include a first membrane layer 252A, a second membrane layer 252B, and an adhesive layer 252C (e.g., a double-sided tape) disposed between first membrane layer 252A and second membrane layer 252B. First type of cells 266 may be formed on first membrane layer 252A and second type of cells 268 may be formed on second membrane layer 252B. Adhesive layer 252C may define a channel to facilitate coculturing of first type of cells 266 and second type of cells 268.

For example, first type of cells 266 may include hepatocytes and second type of cells 268 may include endothelial cells. The hepatocytes and endothelial cells may be grown on either side of membrane 252 in a stoichiometric ratio of 2:1 (Hepatocytes: Endothelial Cells). Further, first channel 260 and second channel 264 of the plurality of layers 202A-202N may support a maximum flow rate of 0.5 ml/min.

Further, each layer may further include a first base member 270 disposed on first substrate 258 (e.g., the first adhesive layer). First base member may include an inlet (e.g., inlets 274A and 274B) connected to a first manifold assembly (e.g., manifold assembly 204 as shown in FIG. 2A). Further, each layer may further include a second base member 272 disposed on second substrate 262 (e.g., the second adhesive layer). Second base member 272 or first base member 270 may include an outlet (e.g., outlets 276A and 276B) connected to a second manifold assembly (e.g., manifold assembly 206 as shown in FIG. 2A). For example, each of first base member 270 and second base member 272 comprises acrylic.

Referring back to FIG. 2A, multi-layered bio purifier may include a first manifold assembly 204 to split incoming blood into first channel 260 (e.g., of FIG. 2B) and second channel 264 (e.g., of FIG. 2B) of the plurality of layers. The blood may include a plasma component of blood. In an example, first manifold assembly 204 may include a first manifold layer 204A to split a first portion of the incoming blood into a plurality of first paths 208A. For example, each first path may be connected to an input (i.e., inlet 274A) of first channel 260 of one of the plurality of layers. Further, first manifold assembly 204 may include a second manifold layer 204B to split a second portion of the incoming blood into a plurality of second paths 208B. For example, each second path is connected to an input (e.g., inlet 274B) of second channel 264 of one of the plurality of layers. Each of the number of first paths 208A and the number of second paths 208B is equal to the number of layers in multi-layered bio purifier 200.

Further, multi-layered bio purifier may include a second manifold assembly 206 to combine processed blood from first channel 260 and second channel 264 of the plurality of layers. The processed blood may include detoxified or purified blood. In an example, second manifold assembly 206 may include a third manifold layer 206A to receive and combine the processed blood from a plurality of third paths 210A. For example, each third path may be connected to an output (e.g., outlet 276A) of first channel 260 of one of the plurality of layers. Further, second manifold assembly 206 may include a fourth manifold layer 206B to receive and combine the processed blood from a plurality of fourth paths 210B. For example, each fourth path may be connected to an output (e.g., outlet 276B) of second channel 264 of one of the plurality of layers. Each of the number of third paths 210A and the number of fourth paths 210B is equal to the number of layers in multi-layered bio purifier 200.

Figure 3A:
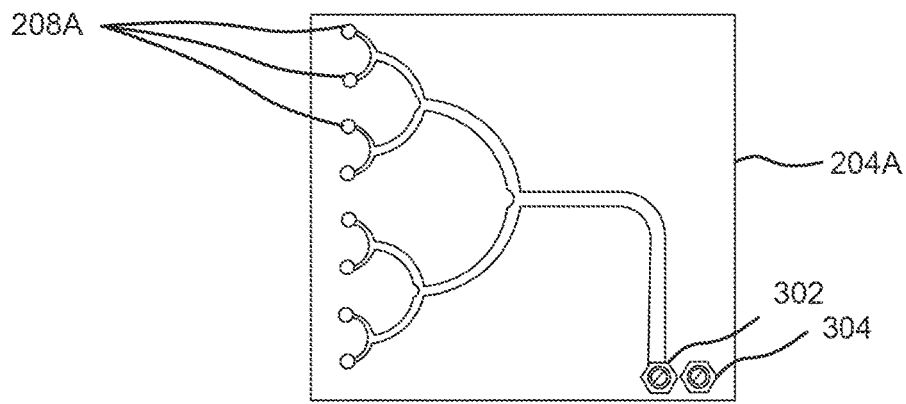
FIG. 3A is a schematic top view of the example first manifold assembly of FIG. 2A.

FIG. 3A is a schematic top view of example first manifold assembly 204 of FIG. 2A. For example, similarly named elements of FIG. 3A may be similar in structure, function, or both to elements described with respect to FIG. 2A. As shown in FIG. 3A, first manifold layer 204A may include a first inlet 302 to receive and split the first portion of the incoming blood/plasma into plurality of first paths 208A and a second inlet 304 to receive and split the second portion of the incoming blood into plurality of second paths 208B.

Figure 3B:
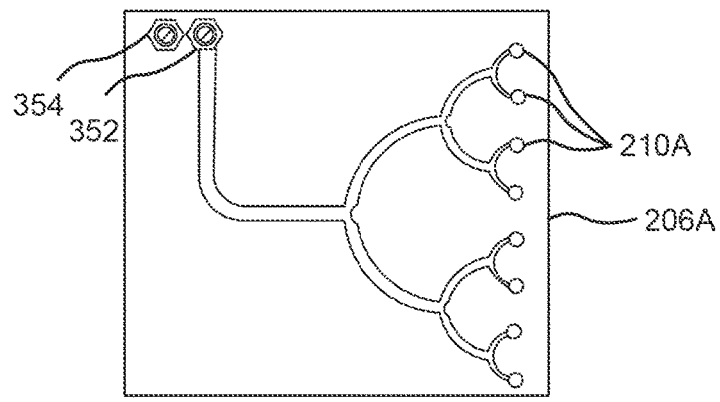
FIG. 3B is a schematic bottom view of the example first manifold assembly of FIG. 2A.

FIG. 3B is a schematic bottom view of example first manifold assembly 206 of FIG. 2A. For example, similarly named elements of FIG. 3B may be similar in structure, function, or both to elements described with respect to FIG. 2A. As shown in FIG. 3B, third manifold layer 206A may include a first outlet 352 to receive and combine the processed blood from a plurality of third paths 210A and a second outlet 354 to receive and combine the processed blood from a plurality of fourth paths 210B.

Figure 3C:
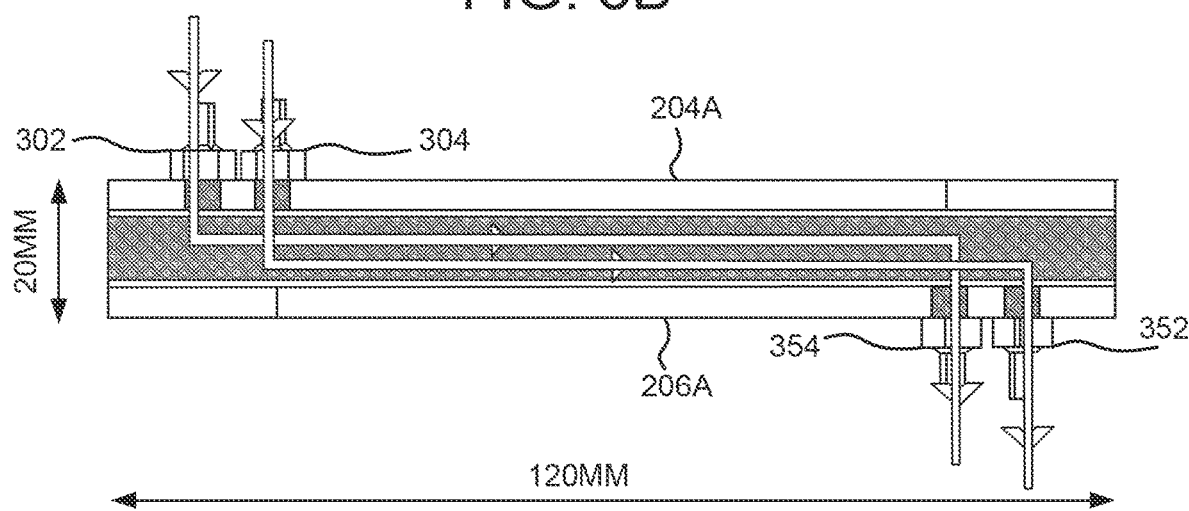
FIG. 3C is a schematic side view of the example multi-layered bio purifier of FIG. 2A.

FIG. 3C is a schematic side view of example multi-layered bio purifier 200 of FIG. 2A. For example, similarly named elements of FIG. 3C may be similar in structure, function, or both to elements described with respect to FIG. 2A. In the example shown in FIG. 3C, multi-layered bio purifier 200 may have a dimension of about 120 mm in x-axis and y-axis and about 20 mm in z-axis.

Thus, multi-layered bio purifier 200 described herein may provide a systematic array of 2 cell types which function as a mini-liver. Multi-layered bio purifier 200 may be a multi-layered microfluidic platform. Each layer is composed of 2 channels. The channels are isolated by a customised and selectively permeable membrane (e.g., polycarbonate; 0.2-micron pore size, 100-micron thickness; coated with poly I lysine). Hepatocytes and endothelial cells are grown on either side of this membrane in a stoichiometric ratio of 1:2. This may be the optimum ratio for maximum detoxification efficacy. The cells cross-talk with each other and complement the detoxification functions. A state-of-the-art manifold assembly is integrated in multi-layered bio purifier 200 to split the incoming plasma flow into multiple channels. A similar manifold is present at the other end of multi-layered bio purifier 200 to collect the processed/detoxified plasma.

The multi-layered bio purifier 200 is designed and developed to grow 2 different types of mammalian cells, for instance, hepatocytes and endothelial cells. These cells when grown together, complement each other's functions and therefore the entire assembly works like a mini liver. A unique, customized membrane is used in multi-layered bio purifier 200 which allows the user to grow 2 different types of cells. Multi-layered bio purifier 200 has flow paths/channels which support a maximum flow rate of 0.5 mL/min. Multi-layered bio purifier 200 may support the growth and residence of up to $10^{10}$ cells in either channel. The unique character of multi-layered bio purifier 200 is that this arrangement mimics the architecture of cellular lining and blood vessels in the human body. Multi-layered bio purifier 200 can be used multiple times with appropriate cleaning and sterilization. Growth conditions of the cells in multi-layered bio purifier 200 may include: 37-degree Celsius, 5% CO2 and 95% relative humidity. These conditions are optimal for the cells to perform their functions. Multi-layered bio purifier 200 design has been made to grow any kind of mammalian cell. Currently hepatocytes and endothelial cells have been grown. In the future, multi-layered bio purifier 200 can be used to grow different cells like B cells and the like, which can aid in developing a device for diabetes management.

Figure 4:
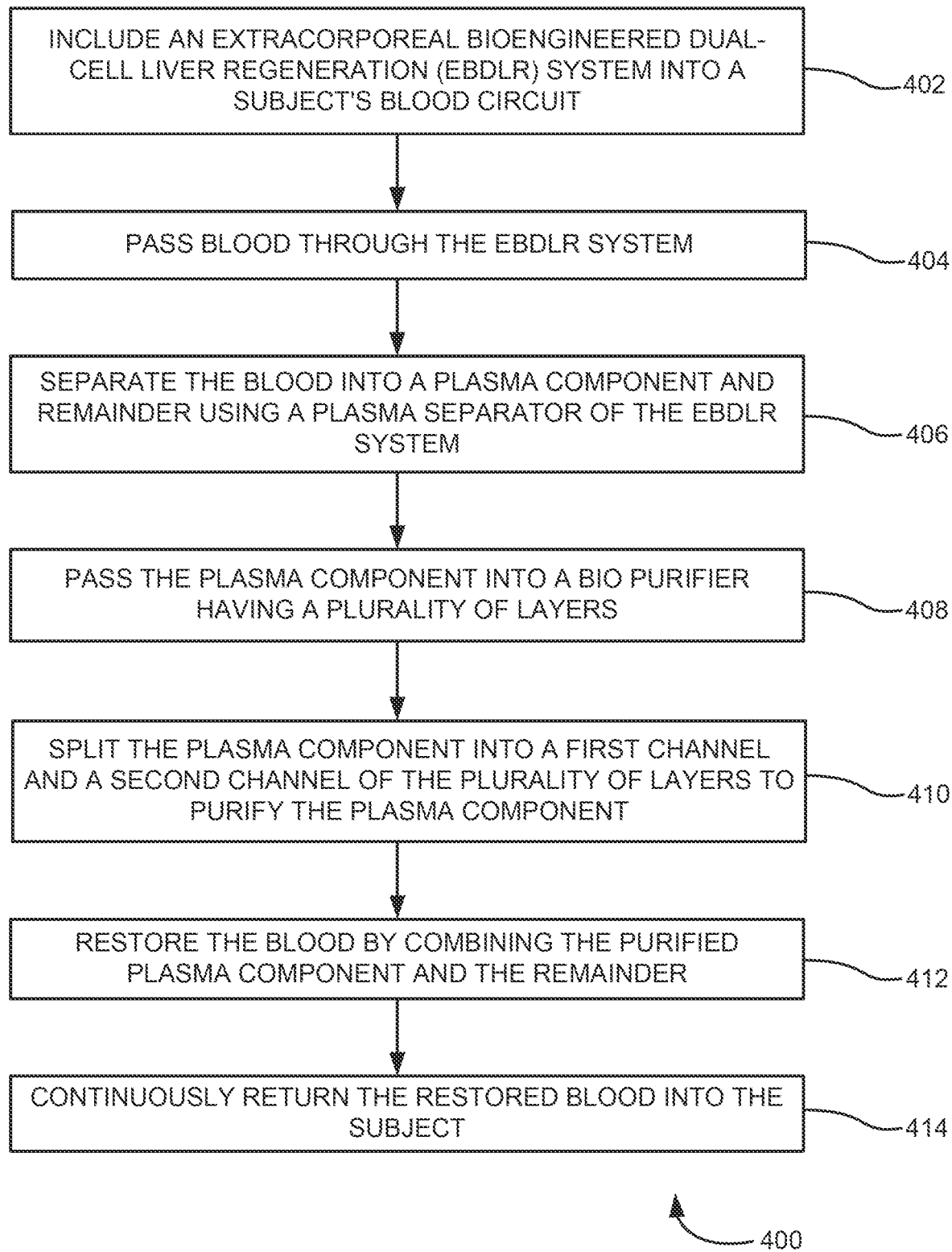
FIG. 4 is a flow diagram illustrating an example method for treating a subject with acute liver failure.

FIG. 4 is a flow diagram illustrating an example method 400 for treating a subject with acute liver failure. Example method 400 depicted in FIG. 4 represents generalized illustrations, and other processes may be added, or existing processes may be removed, modified, or rearranged without departing from the scope and spirit of the present application.

At 402, an extracorporeal bioengineered dual-cell liver regeneration (EBDLR) system may be included into the subject's blood circuit. The blood circuit may refer to a blood line for transporting blood between a patient and the EBDLR system. At 404, blood may be passed through the EBDLR system. In an example, the blood may be continuously taken from the subject. In an example, passing the blood through the EBDLR system may include providing a bubble-free infusion of the blood taken from the subject via a first pump into the plasma separator using an arterial drip chamber. Further, a pressure of the blood entering the arterial drip chamber may be motored using an arterial pressure transducer and a feedback may be provided to a processor to regulate a flow rate of the blood based on the pressure of the blood entering the arterial drip chamber.

At 406, the blood may be separated into a plasma component and remainder using a plasma separator of the EBDLR system. For example, the blood may be passed through the plasma-separation element with a flow rate of 0-300 ml/min. In an example, heparin may be injected in a blood line of the plasma separator based on an activated clotting time (ACT) using a heparin pump. The heparin may be to prevent clogging in the plasma separator due to blood clotting.

At 408, the plasma component may be passed into a bio purifier having a plurality of layers. In an example, each layer may include hepatocytes on a first side of a membrane in a first channel and endothelial cells on a second side of the membrane in a second channel. For example, the plasma component may be passed through the bio purifier with a flow rate in a range of 0-100 ml/min.

In an example, passing the plasma component into the bio purifier may include:
  collecting the plasma component into a first reservoir,
  passing the plasma component from the first reservoir into the bio purifier via a second pump, and
  monitoring a pressure of the plasma component passing into the bio purifier using a first pressure transducer and providing a feedback to a processor to regulate a flow rate of the plasma component.

At 410, the plasma component may be split into the first channel and the second channel of the plurality of layers to purify the plasma component. In an example, splitting the plasma component into the first channel and the second channel of the plurality of layers may include:
  splitting, using a first manifold layer, a first portion of the incoming blood into a plurality of first paths. In an example, each first path may be connected to an input of the first channel of one of the plurality of layers.
  splitting, using a second manifold layer, a second portion of the incoming blood into a plurality of second paths. In an example, each second path may be connected to an input of the second channel of one of the plurality of layers.

At 412, the blood may be restored by combining the purified plasma component and the remainder. After plasma has been purified, the blood is restored by combining the purified blood plasma and the remainder and the restored blood is continuously returned into the patient.

At 414, the restored blood may be continuously returned into the subject. Further, the EBDLR system may be separated from the patient's blood circuit upon performing the blood purification process for a predefined number of days (e.g., 28 days). In an example, continuously returning the restored blood into the subject may include providing a bubble-free infusion of the restored blood into the subject using a venous drip chamber and an air bubble detector.

Further, a pressure of the restored blood entering the venous drip chamber may be monitored by a venous pressure transducer a feedback may be provided to a processor to regulate a flow rate of the restored blood.

In an example, continuously returning the restored blood into the subject may include monitoring, using an optical blood detector, the restored blood for haemolysis. In response to detecting the haemolysis, the EBDLR system may be terminated from the subject's blood circuit and an alarm may be generated.

In an example, method 400 may include passing the purified plasma component through a dual filtration unit to filter the purified plasma component. For example, the dual filtration unit may include a membrane to devoid any residual/dislodged cells from the bio purifier and/or bacterial contaminants from the purified plasma component. The blood may be restored by combining the filtered plasma component and the remainder. The purified plasma component may be passed through the dual filtration unit with a flow rate in a range of 0-300 ml/min.

In an example, passing the purified plasma component through the dual filtration unit may include collecting the purified plasma component from the bio purifier into a second reservoir. Further, the purified plasma component may be passed from the second reservoir into the dual filtration unit via a third pump. Furthermore, a pressure of the purified plasma component passing into the dual filtration unit may be monitored using a second pressure transducer and a feedback may be provided to a processor to regulate a flow rate of the purified plasma component.

Thus, the EBDLR system described herein functions like a liver. Detoxification capabilities of the EBDLR system can be used to treat a subject with an acute liver failure. The EBDLR system functions without affecting the haemodynamic equilibrium of the patient. Haemolysis-free plasma is processed/detoxified through the bio purifier. The multi-layered bio purifier uses bioengineered components (e.g., cells) to detoxify/purify diseased plasma. Uniform flow distribution is achieved via integrated manifold assemblies in the bio purifier assembly, which is developed by employing principles of Murray's laws and biomimetics. The biocompatible membrane for the cell culture is customized as per the need and is made of polycarbonate material with a pore size of at least 0.4 microns. Effective detoxification happens at a flow rate ranging from 0.2 to 0.4 ml/min. These flow rates correspond to a shear stress range of 200 to 500 dyne/cm2. The EBDLR system draws blood from the subject without affecting the blood pressure and does not introduce turbulence in the native blood flow. Various pressure transducers enable the user to identify various flow parameters and optimize the operations. Once primed, the EBDLR system runs continuously in an automated manner. The EBDLR system is easy to setup, can run continuously for 24 hours and has a capability to purify the complete blood volume from a patient's body. The EBDLR system has proved to work with 100% efficacy in the porcine model of acute liver failure.

Results from Large-Animal Trial Using the EBDLR System

Exhaustive animal trials were performed using the EBDLR system to evaluate the efficacy of the EBDLR system. Briefly, the acute liver failure was induced in Yorkshire pigs using D-galactosamine. 24 hours post induction, the animals were connected to the EBDLR system for 4 hours. Blood was detoxified using the EBDLR system. The device connection procedure was done in the animals without anaesthesia. In this case, haemodynamic stability was maintained without anesthesia. This process was repeated after 48 hours.

The blood glucose monitoring and maintenance is of critical importance for an individual undergoing treatment with the EBDLR system. With the examples described herein, a no-infection condition may be achieved during the entire course of experiment which lasted for 28 days. During the course of the study, the bio purifier and plasma filter were replaced at regular intervals (e.g., 24 hours) whereas the rest of the EBDLR system was thoroughly decontaminated and reused for the subsequent cycles. A detailed record of clinical investigations was maintained. This included blood glucose, liver function parameters, kidney function tests and infection checks.

The overall outcome of the experiment was that the animals connected/treated with the EBDLR system post liver injury, recovered fully in 28 days whereas, the control/untreated animals succumbed to acute liver failure in 36-48 hours.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. An extracorporeal bioengineered dual-cell liver regeneration (EBDLR) system comprising:
 a multi-layered bio purifier having a plurality of layers, each layer comprising:
  a membrane;
  a first type of cells on a first side of the membrane in a first channel; and
  a second type of cells on a second side of the membrane in a second channel;
 a plasma separator to receive blood from a subject via a first pump and separate a plasma component from the blood;
 a first reservoir to collect the plasma component;
 a second pump to move the plasma component from the first reservoir to the multi-layered bio purifier at a predefined flow rate, wherein the multi-layered bio purifier is to distribute the plasma component into the first channel and the second channel of each layer to purify the plasma component;

a second reservoir to collect the purified plasma component; and a third pump to infuse the purified plasma component from the second reservoir into the subject.

2. The EBDLR system of claim 1, further comprising:
a dual filtration unit having a 2- and 0.2-micron membrane to receive the purified plasma from the second reservoir via the third pump and filter the purified plasma to remove residual or dislodged cells from the purified plasma, wherein the filtered plasma is infused into the subject.

3. The EBDLR system of claim 1, further comprising:
an arterial drip chamber to provide a bubble-free infusion of the blood, received from the subject via the first pump, into the plasma separator; and
an arterial pressure transducer to monitor a pressure of the blood entering the arterial drip chamber and provide feedback to a processor to regulate a flow rate of the blood based on the pressure of the blood entering the arterial drip chamber.

4. The EBDLR system of claim 1, further comprising:
a venous drip chamber to provide a bubble-free infusion of a mixture of the purified plasma component and the plasma-separated blood, from which the plasma component has been separated by the plasma separator, into the subject; and
a venous pressure transducer to monitor a pressure of the mixture entering the venous drip chamber and also the subject's blood pressure and provide feedback to a processor to regulate a flow rate of the mixture based on the pressure of the mixture entering the venous drip chamber.

5. The EBDLR system of claim 4, further comprising:
an air bubble detector to receive the mixture of the purified plasma component and the plasma-separated blood via the venous drip chamber and infuse the purified plasma and blood mixture into the subject without any air bubble.

6. The EBDLR system of claim 4, further comprising:
an optical blood detector to:
monitor the mixture of the purified plasma component and the plasma-separated blood for haemolysis; and
in response to detecting the haemolysis, terminate a process of detoxifying or purifying the plasma component by disconnecting the bioengineered dual-cell liver regeneration system from the subject's blood circuit and generate an alarm.

7. The EBDLR system of claim 1, further comprising:
a first pressure transducer to measure a pressure between the second pump and the multi-layered bio purifier;
a second pressure transducer to measure a pressure between the multi-layered bio purifier and the third pump; and
a third pressure transducer to measure a pressure between the plasma separator and a venous drip chamber that collects the mixture of the purified plasma component and plasma-separated blood from the plasma separator.

8. The EBDLR system of claim 1, further comprising:
a thermally regulated chamber to house the multi-layered bio purifier, wherein the thermally regulated chamber is to maintain a defined temperature of the plasma component passing through the multi-layered bio purifier.

9. The EBDLR system of claim 8, further comprising:
a first temperature sensor to sense a temperature of the plasma component entering the multi-layered bio purifier; and
a second temperature sensor to sense a temperature of the plasma component leaving the multi-layered bio purifier.

10. The EBDLR system of claim 1, further comprising:
a heparin pump to inject heparin in a blood line of the plasma separator based on an activated clotting time (ACT), wherein the heparin is to prevent clogging in the plasma separator due to blood clotting.

11. The EBDLR system of claim 1, further comprising:
at least one pressure sensor to monitor a flow rate of the blood and/or the plasma component and provide feedback to a processor to regulate a flow rate in a range of 0 to 100 ml/min and 0 to 300 ml/min of plasma and blood, respectively.

12. The EBDLR system of claim 1, wherein the multi-layered bio purifier comprises:
a first manifold assembly to split the plasma component into the first channel and the second channel of the plurality of layers; and
a second manifold assembly to combine the purified plasma component from the first channel and the second channel of the plurality of layers.

13. The EBDLR system of claim 12, wherein each layer further comprising:
a first base member disposed on a first adhesive layer, wherein the first base member comprises an inlet connected to the first manifold assembly, and wherein the inlet is to receive the plasma component; and
a second base member disposed on a second adhesive layer, wherein the second base member comprises an outlet connected to the second manifold assembly, and wherein the outlet is to output the purified plasma component.

14. The EBDLR system of claim 1, wherein the multi-layered bio purifier comprises:
a total number of the first type of cells in a range of $10^6$-$10^{10}$ cells; and
a total amount of the second type of cells in a range of $10^6$-$10^{10}$ cells.

15. The EBDLR system of claim 1, wherein the first type of cells comprises hepatocytes and the second type of cells comprises endothelial cells.

* * * * *